United States Patent
Filbrich et al.

(10) Patent No.: US 8,521,852 B2
(45) Date of Patent: Aug. 27, 2013

(54) METHOD AND SYSTEM FOR REGISTERING A CLIENT DEVICE IN A MULTI-ROOM DIGITAL VIDEO RECORDING SYSTEM

(75) Inventors: Walter F. Filbrich, Manhattan Beach, CA (US); Raynold M. Kahn, Los Angeles, CA (US); Steven Kasakitis, Redondo Beach, CA (US); Christopher R. Roy, Los Angeles, CA (US); Erin K. Nelson, Torrance, CA (US); Christopher J. Cabanne, Woodland Hills, CA (US); Luke J. Crook, San Pedro, CA (US); Gregory Vagnati, Los Angeles, CA (US); Noreen Fong, Cerritos, CA (US); Eric J. Bennett, Los Angeles, CA (US); Romulo Pontual, Hermosa Beach, CA (US); Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 70 days.

(21) Appl. No.: 12/647,895

(22) Filed: Dec. 28, 2009

(65) Prior Publication Data
US 2011/0161396 A1 Jun. 30, 2011

(51) Int. Cl.
*G06F 15/177* (2006.01)

(52) U.S. Cl.
USPC ........................................................ 709/220

(58) Field of Classification Search
USPC ........................................................ 709/220
See application file for complete search history.

(56) References Cited

U.S. PATENT DOCUMENTS

| | | | | |
|---|---|---|---|---|
| 6,044,471 | A * | 3/2000 | Colvin | 726/28 |
| 6,446,211 | B1 * | 9/2002 | Colvin | 726/22 |
| 6,460,142 | B1 * | 10/2002 | Colvin | 726/27 |
| 6,484,264 | B1 * | 11/2002 | Colvin | 726/18 |
| 6,792,548 | B2 * | 9/2004 | Colvin | 726/30 |
| 6,901,436 | B1 * | 5/2005 | Schneider | 709/219 |
| 7,466,984 | B2 * | 12/2008 | Chaudry et al. | 455/445 |
| 7,509,495 | B2 * | 3/2009 | Roig | 713/168 |
| 7,552,341 | B2 * | 6/2009 | Chen et al. | 713/187 |
| 7,689,510 | B2 * | 3/2010 | Lamkin et al. | 705/51 |
| 7,698,468 | B2 * | 4/2010 | Hwang | 709/249 |
| 7,814,179 | B2 * | 10/2010 | Shen et al. | 709/220 |
| 7,831,696 | B2 * | 11/2010 | Park | 709/223 |
| 7,865,738 | B2 * | 1/2011 | Buck et al. | 713/184 |
| 8,055,729 | B2 * | 11/2011 | Warasawa | 709/219 |
| 8,234,715 | B2 * | 7/2012 | Zollinger et al. | 726/29 |
| 2002/0129262 | A1 * | 9/2002 | Kutaragi et al. | 713/193 |
| 2003/0177271 | A1 * | 9/2003 | Park | 709/246 |
| 2004/0184431 | A1 * | 9/2004 | Park | 370/346 |

(Continued)

OTHER PUBLICATIONS

Doug, How to Setup, Stream and Watch Netflix on Your Xbox 360, Apr. 10, 2009, http://www.gotknowhow.com/articles/how-to-setup-stream-and-watch-netflix-on-xbox-360, retrieved Jul. 17, 2012, pp. 1-11.*

*Primary Examiner* — Alicia Baturay

(57) ABSTRACT

A system and method for registering a client device with a server device includes the server device having a display. The display displays a first identifier in response to entering a registration mode. A client device is in communication with the server device. The client device detects that the server device is in registration mode and communicates a second identifier to the client device. The server device compares the first identifier and the second identifier and, after comparing, registers the client device at the server device.

24 Claims, 7 Drawing Sheets

(56) References Cited

U.S. PATENT DOCUMENTS

| | | | |
|---|---|---|---|
| 2005/0038875 A1* | 2/2005 | Park | 709/219 |
| 2007/0064712 A1* | 3/2007 | Lee et al. | 370/395.5 |
| 2007/0088952 A1* | 4/2007 | Hewitt et al. | 713/171 |
| 2007/0143623 A1* | 6/2007 | Walmsley et al. | 713/176 |
| 2007/0162762 A1* | 7/2007 | Huh et al. | 713/182 |
| 2009/0041005 A1* | 2/2009 | Chen | 370/352 |
| 2009/0132698 A1* | 5/2009 | Barnhill, Jr. | 709/224 |
| 2010/0262833 A1* | 10/2010 | Zollinger et al. | 713/180 |
| 2011/0004653 A1* | 1/2011 | Cavill et al. | 709/203 |
| 2011/0125585 A1* | 5/2011 | Dow et al. | 705/14.66 |
| 2011/0125753 A1* | 5/2011 | Dow et al. | 707/740 |
| 2011/0125774 A1* | 5/2011 | Dow et al. | 707/769 |
| 2011/0126230 A1* | 5/2011 | Dow et al. | 725/39 |

* cited by examiner

METHOD AND SYSTEM FOR REGISTERING A CLIENT DEVICE IN A MULTI-ROOM DIGITAL VIDEO RECORDING SYSTEM

TECHNICAL FIELD

The present disclosure relates generally to a multi-room digital video recording system, and, more specifically, for registering a client device in the multi-room digital video recording system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

Because each electronic device receives the signals and also processes the signals, the customer experiences at each of the electronic devices may be slightly different. Consistency and the quality that the customer perceives at each device are important for providing a consistent customer experience.

Providing multi-room digital video recording is important to content providers. Security is also an important aspect of a multi-room pivotal video recording system from a system provider standpoint.

SUMMARY

The present disclosure allows client registration between client devices and a server device to increase security of the system.

In one aspect of the disclosure, a method includes entering a registration mode at a server device, displaying a first identifier in response to the registration mode, detecting the server device in registration mode at a client device, entering a second identifier at the client device, communicating the second identifier to the server device, comparing the first identifier and the second identifier at the server device and, after comparing, registering the client device at the server device.

In a further aspect of the disclosure, a system includes a server device having a display. The display displays a first identifier in response to entering a registration mode. A client device is in communication with the server device. The client device detects the server device in registration mode and communicates a second identifier to the client device. The server device compares the first identifier and the second identifier and, after comparing, registers the client device at the server device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
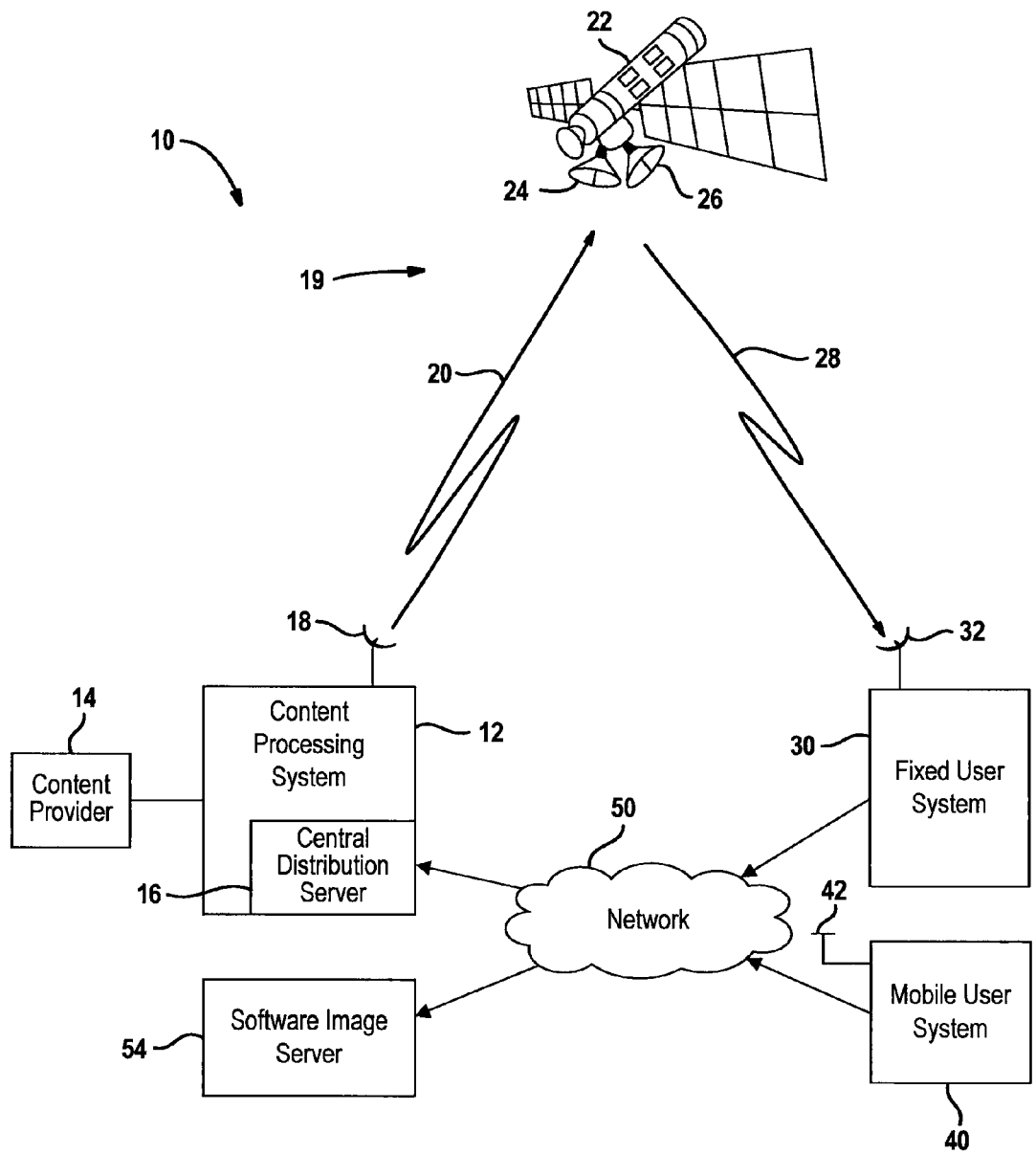
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol-(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
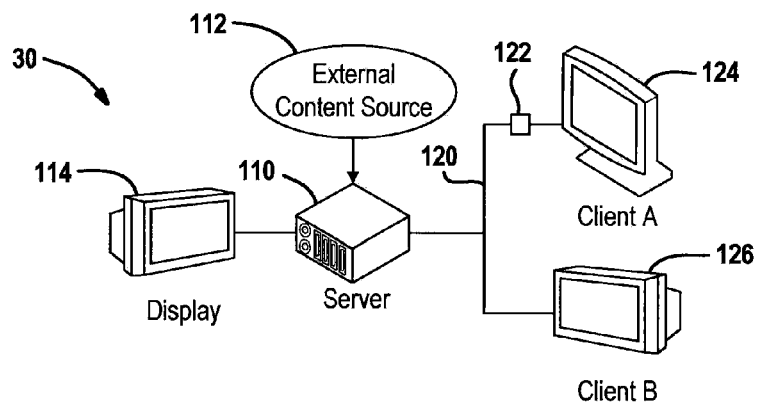
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
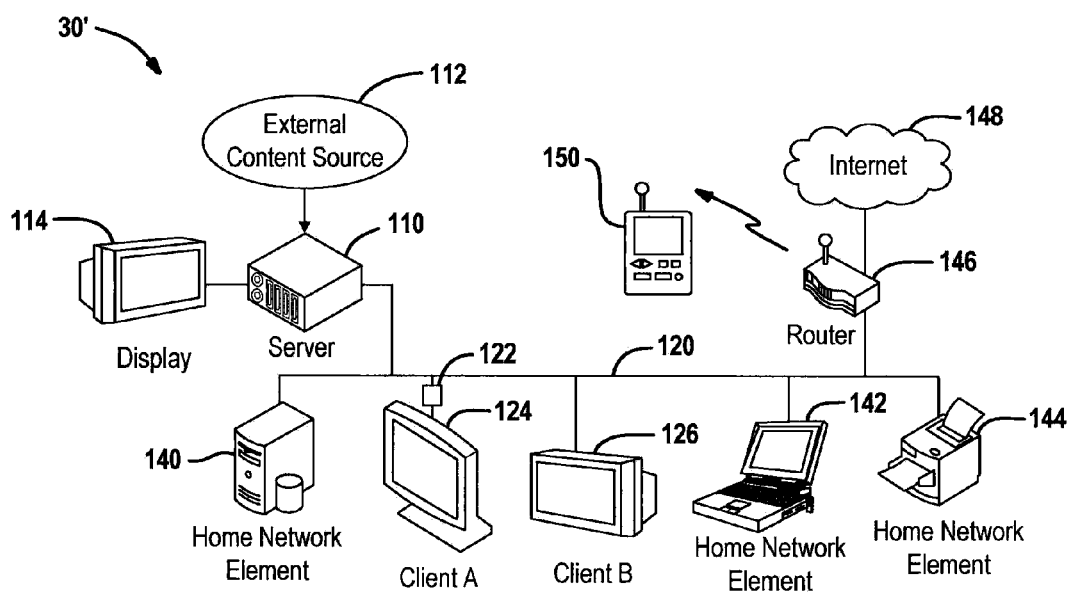
FIG. 3 is a block diagrammatic view of a second embodiment of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
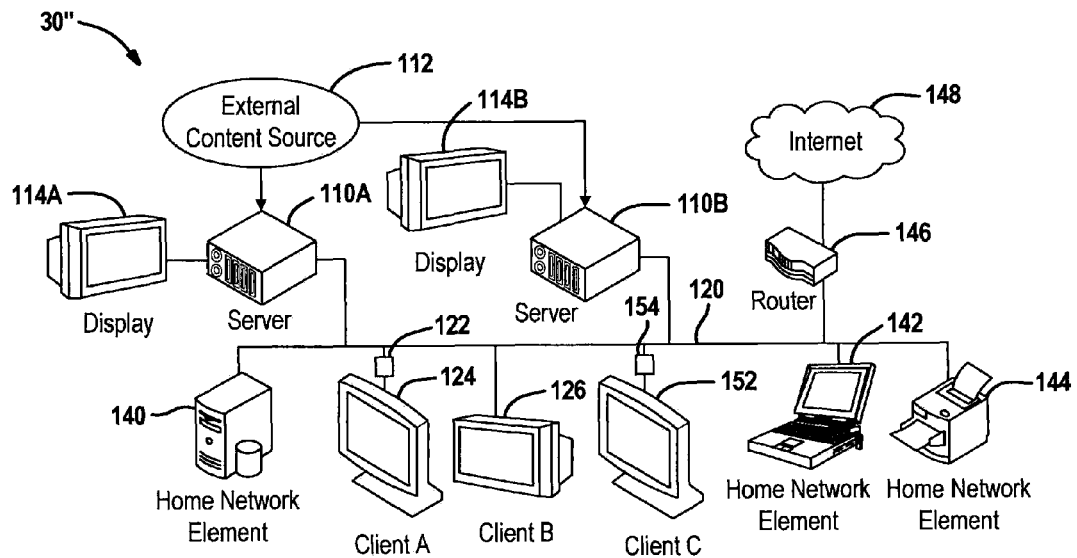
FIG. 4 is a block diagrammatic view of a third embodiment of a network topology.

Referring now to FIG. 4, another example of a fixed user system 30" is illustrated. In this embodiment, the same elements from FIGS. 2 and 3 are provided with the same reference numerals. The local area network 120 may also include two servers 110A and 110B. Each server may include an optional display device 114A, 114B, respectively. In this embodiment a third client, Client C, is illustrated having a display 152 and a client device 154.

Figure 5:
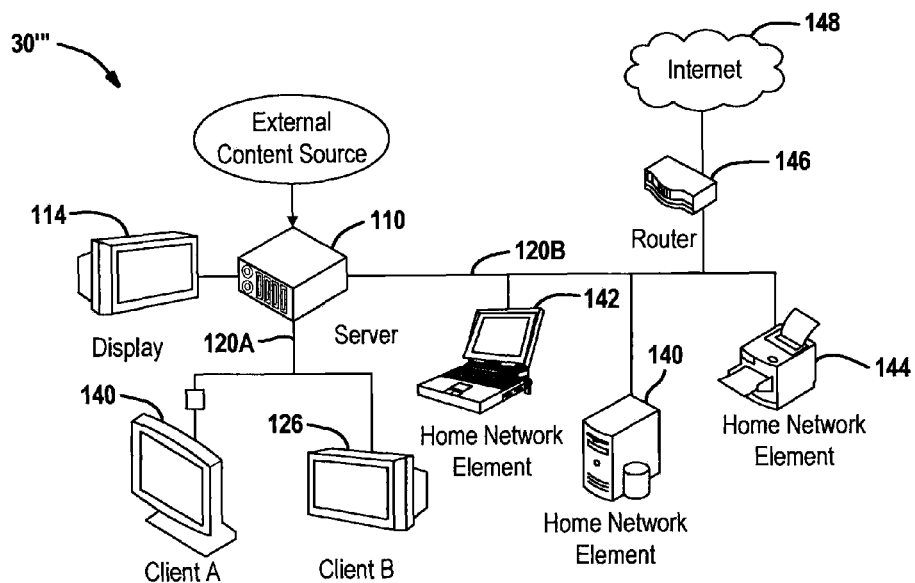
FIG. 5 is a block diagrammatic view of a fourth embodiment of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
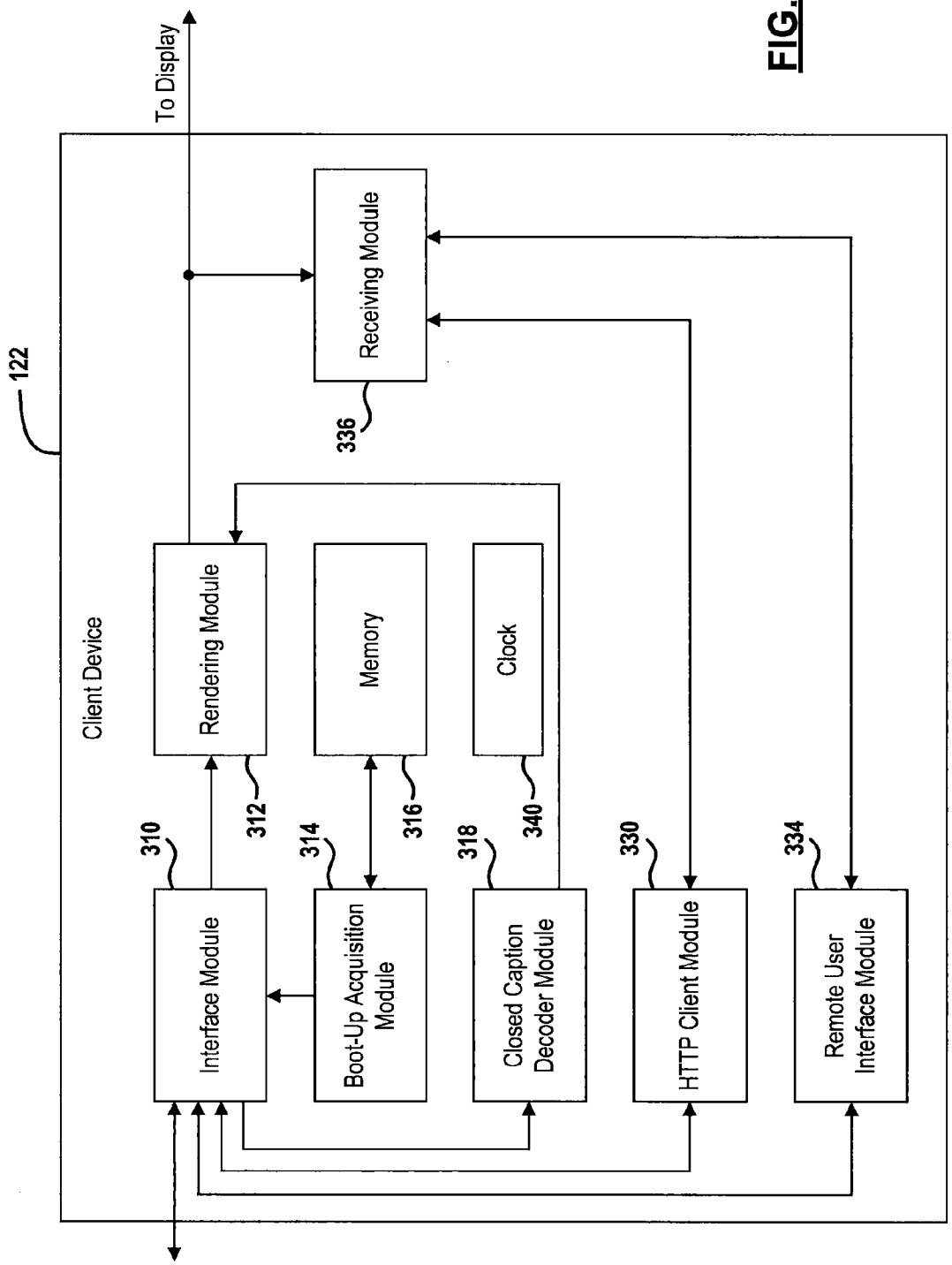
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. The rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlayed upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
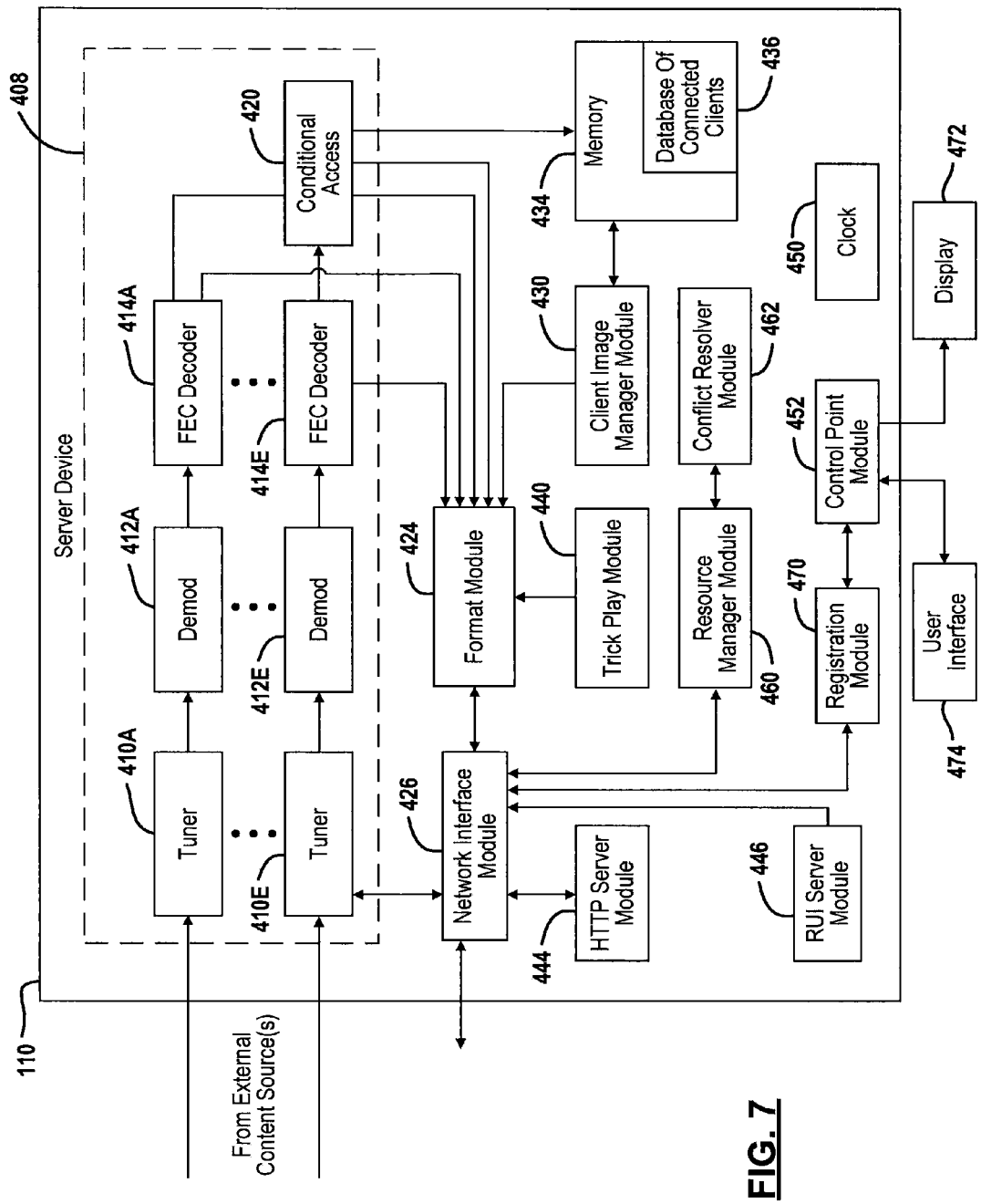
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a plurality of tuners 410A-E, a plurality of demodulators 412A-E, a plurality of forward error correction decoders 414A-e and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display. The network interface module 426 may also be used for receiving signals from a client device or devices.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

The server device 110 may also include a resource manager module 460 that is in communication with a conflict resolver module 462. The resource manager module 460 may be in communication with a network interface module 426. The network interface module 426 may receive signals such as control signals or selection signals from various client devices. The resource manager module 460 may identify when a conflict arises from a conflict-causing request received from one of the client devices.

A conflict may arise when a concurrent view or service activity requires more resources than those available at the server device.

As will be further described below, the resource manager module 460 may generate a set of "sufficient sets." The sufficient sets may be provided to the conflict resolver module 462. The resource manager module 460 or the conflict resolver module 462 may then determine a course of action to follow for the encountered conflict. The conflict resolver module 462 may consider the type of activity generating the conflict-causing request versus the activities in the set of sufficient sets. The conflict resolver module 462 returns a sufficient sets sorted according to the requirements of the system. The resource manager module 460 may thus resolve the conflict according to the sufficient sets and prompt the user of a client device for an input, if required. The conflict resolver module 462 may resolve conflicts between various aspects of the operation of the server, including tuner conflicts as will be described below.

The server device 110 may also include a registration module 470 in communication with the control point module 452. The registration module 470 may allow registration of a client device with a server device. Registration between a client device and a server device 110 may be mandatory before the server device will provide content to the server device. The registration module 470 may be used to generate an identifier and display the identifier on a display 472. A registration mode may be entered through a user interfacer for 474. The user interface may be a keypad on the server device or a graphical user interface that is displayed on the display 472. The user interface 474 may enter a registration mode and the registration module 470 may generate the identifier on the display 472. The network interface module 426 may receive a second identifier from a new or moved client device. The registration module 470 may compare the received identifier with the identifier that was displayed previously on the display 472. The client device may then be registered when the two identifiers are the same.

The registration module 470 may also be used for transferring a profile of a user device to a new location as further described below.

Figure 8:
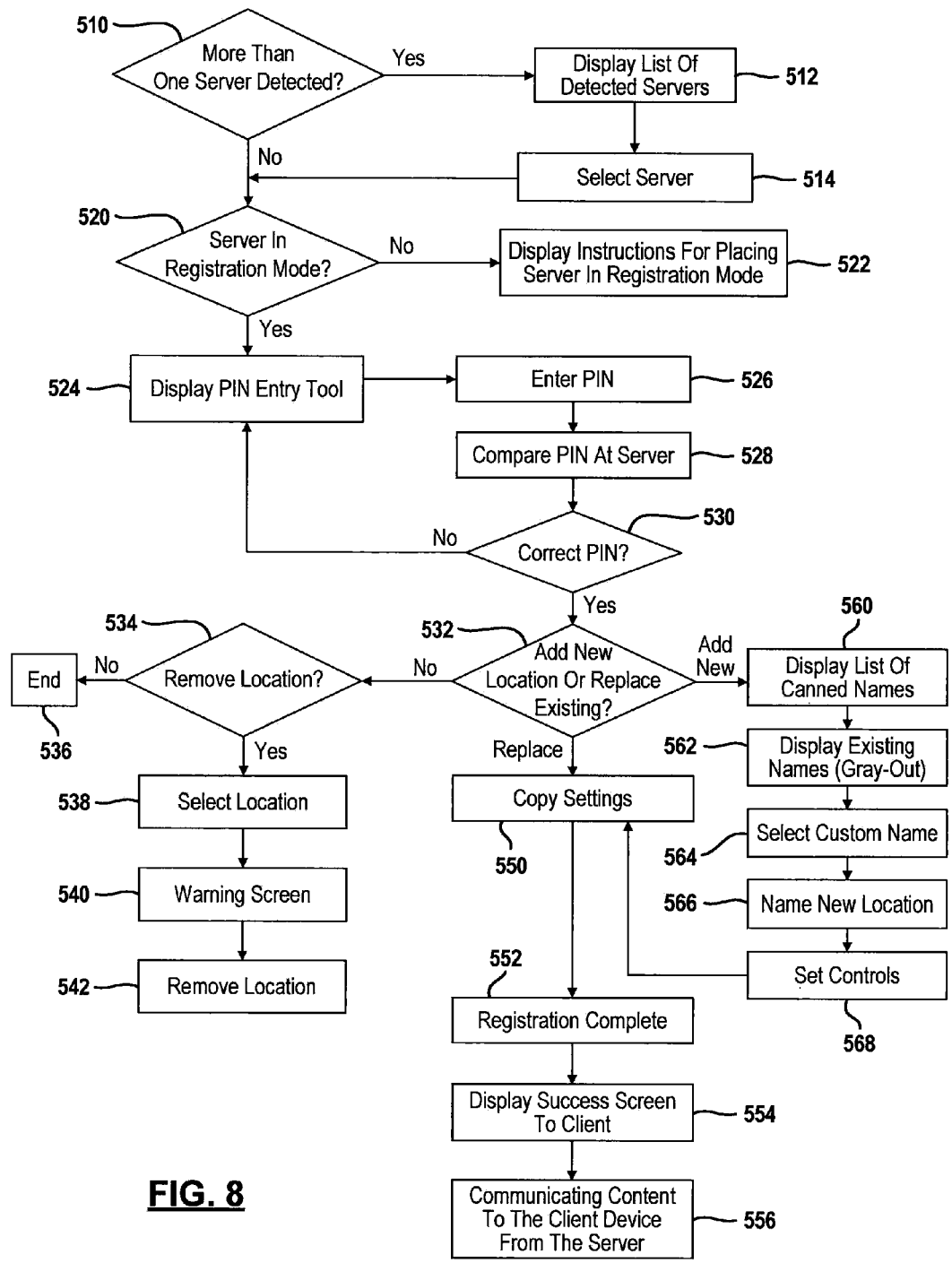
FIG. 8 is a flow chart of a method of registering a client device with a user device.

Referring now to FIG. 8, a method for registering a client with a server device is set forth. As mentioned above, more than one server may be provided within a network. In step 510, if more than one server detected by a client device, step 512 displays the list of detected servers and a server from the list is selected in step 514.

In step 510, when more than one server is not detected and after step 514, step 520 determines if the server is in a registration mode. Determining whether the server is in a registration mode may be performed by a client device communicating a query signal to the server device. A response signal from the server device may indicate whether the server is in registration mode or not in the registration mode. In step 520, if the server device is not in a registration mode, step 522 may display instructions for placing the server in a registration mode.

When the server is in a registration mode in step 520, step 524 displays a pin or identifier using a pin entry tool. Step 524 displays the PIN or identifier entry tool. In step 526, the identifier (PIN) is entered. The identifier may be entered using a user interface such as a physical alpha-numerical keypad or a graphical user interface associated with the client device. In step 528, the server device compares the identifier entered at the server with the identifier that was previously displayed. If in step 530, it is determined whether the correct identifier was entered. If the correct identifier was not entered, the user associated with the client device may be given another opportunity to enter an identifier. The user may be allowed to enter an identifier, a predetermined number of times, before the system may be locked. After step 530, a corrected identifier has been entered, step 532 is performed. In step 532, if an additional location or replacing an additional device is not performed, step 534 determines whether a location is to be removed. In step 534, if no location is to be removed, step 536 ends the process. In step 534, if a location is to be removed, step 538 is performed. In step 538, a location may be selected from a graphical user interface. In step 540, a warning screen may be generated to the user of the client device that a location is to be removed. In step 542, a location is removed from the memory at the server device. This may be performed by communicating a removal signal the client device to the server device.

Referring to step 532, if a location is to be replaced step 550 is performed. In step 550, the settings from a previous location may be copied to make the registration process easier. In step 552, the registration may be completed so that the server device may communicate content signal to the server. In step 554, a success signal may be displayed at the display associated with the client device to indicate that the new client device or replacement client device has been registered. In step 556, content from the server device may be communicated to the client device because the registration has been completed.

Referring back to step 532, when a new device is to be added, step 560 is performed. In step 560, a list of predetermined "canned" names may be displayed at the display device associated with the new client device. In step 562, a list of existing names may be provided. Existing names may be grayed out or otherwise not be selectable. In step 564, a custom name may also be used for the new location. A new location name may be entered in step 566. The new location name may also be entered by selecting an available name from the list of pre-canned names. In step 568, various queries for parental controls, tuner controls, or the like may be provided to the user so that proper security may be provided between the client device and the server device. After step 568, steps 550 through 556 may be performed. Step 550 may be performed or bypassed in the new process.

Figure 9:
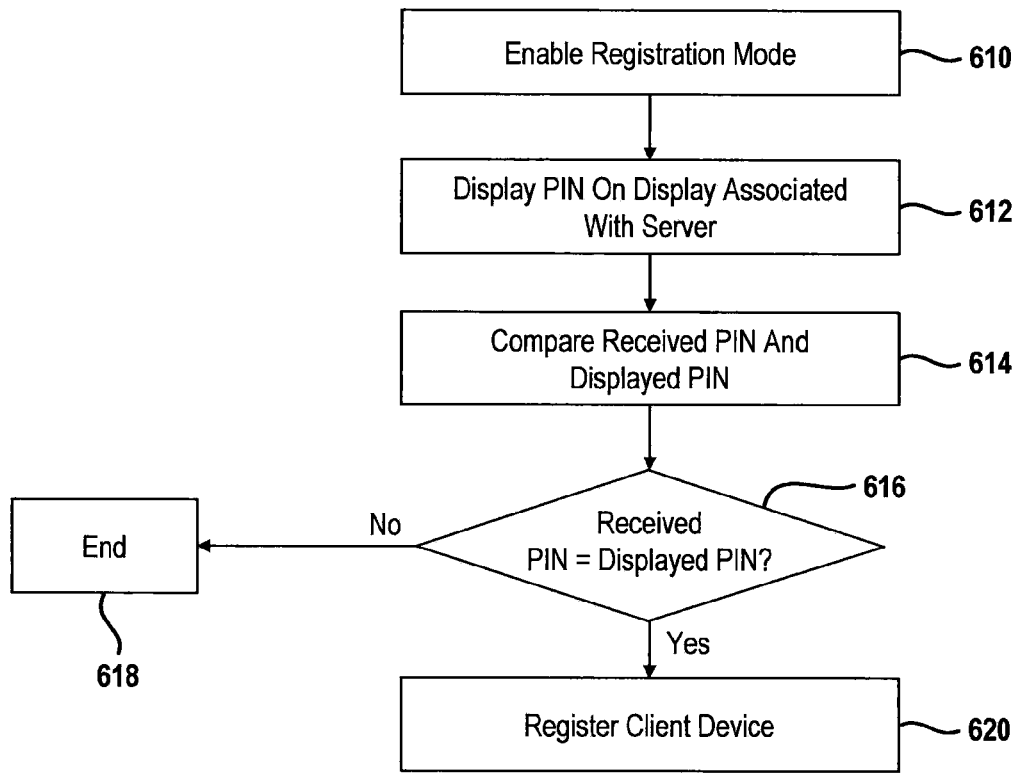
FIG. 9 is a method of registering the client device with the server device from the perspective of the server.

Referring now to FIG. 9, the registration process from the server perspective is set forth. In step 560, the registration mode may be enabled at the server device. This may be performed by entering a code or pushing a button on the server device. Registration mode may also be entered by selecting a button on a graphical user interface. In step 612, an identifier (PIN) may be displayed on the display that is associated with the server.

In step 614, after the user enters an identifier at the client device, the entered identifier is received at the server device. The received identifier and the displayed identifier are thus compared at step 614.

After step 616, the received identifier is compared to the displayed identifier. If the received identifier is not the same as the previously displayed identifier, step 618 ends the process. Although, as mentioned above, multiple opportunities for inputting the proper identifier may be provided to a user of the client device.

In step 616, when the received identifier is the same as the previously displayed identifier, step 620 is performed. In step 620, the client device is registered at the server. When the client device is registered at the server, the communication of content signals from the server to the client device may be performed. The client may be registered by entering a client device identifier within the memory of the server device. Other features or preferences may also be entered at the time of registration including parental controls or other security data.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising:
   entering a registration mode at a server device, said registration mode for registering a client device with the server device to allow the server device to provide content to the client device;
   displaying a first identifier generated at the server in response to the registration mode;
   after entering, detecting the server device in registration mode at the client device;
   entering a second identifier at the client device;
   communicating the second identifier to the server device while the server device is in registration mode;
   comparing the first identifier and the second identifier at the server device while the server device is in registration mode;
   after comparing, registering the client device at the server device; and
   prior to requesting, entering a client device name.
2. A method as recited in claim 1 further comprising after registering, communicating content from the server device to the client device.
3. A method as recited in claim 1 wherein entering a registration mode comprises entering the registration mode in response to a selection at a server user interface.

4. A method as recited in claim 1 wherein displaying a first identifier comprises displaying the first identifier on a display associated with the server device.

5. A method as recited in claim 1 wherein entering a second identifier at the client device comprises entering the second identifier at a graphical user interface associated with the client device.

6. A method as recited in claim 1 wherein communicating the second identifier to the server device comprises communicating the second identifier to the server device through a wired connection.

7. A method as recited in claim 1 wherein communicating the second identifier to the server device comprises communicating the second identifier to the server device through a wireless connection.

8. A method as recited in claim 1 wherein registering the client device at the server device comprises registering the client device as a new device.

9. A method as recited in claim 1 wherein entering the client device name comprises entering the client device name from a canned menu.

10. A method as recited in claim 1 wherein entering the client device name comprises entering the client device name from a graphical user interface associated with the client device.

11. A method as recited in claim 1 wherein registering the client device at the server device comprises registering the client device as a replacement device.

12. A method as recited in claim 1 further comprising copying a previous setting for another client device within the server.

13. A system comprising:
a server device having a display, said display displaying a first identifier in response to entering a registration mode, said registration mode for registering a client device with the server device to allow the server device to provide content to the client device; and
said client device in communication with the server device, said client device detecting the server device in registration mode after entering the registration mode and communicating a second identifier to the client device;
while in the registration mode, said server device comparing the first identifier and the second identifier and, after comparing, registering the client device;
said client device, prior to requesting, enters a client device name.

14. A system as recited in claim 13 wherein the server device comprises a satellite television receiving device.

15. A system as recited in claim 13 wherein the server device, after registering the client device, communicates content from the client device to the server device.

16. A system as recited in claim 13 wherein the server device comprises a server user interface that enters the server device into a registration mode.

17. A system as recited in claim 13 wherein the client device generates a graphical user interface for entering a second identifier.

18. A system as recited in claim 13 further comprising a wired connection communicating the second identifier to the server device.

19. A system as recited in claim 13 further comprising a wireless connection communicating the second identifier to the server device.

20. A system as recited in claim 13 wherein the server device registers the client device as a new device.

21. A system as recited in claim 13 wherein the client device enters a client device name from a canned menu.

22. A system as recited in claim 13 wherein the client device enters a client device name from a graphical user interface associated with the client device.

23. A system as recited in claim 13 wherein the server device registers the client device as a replacement device.

24. A system as recited in claim 13 wherein the server device copies a previous setting from another client device for the client device.

* * * * *